Patented Nov. 4, 1924.

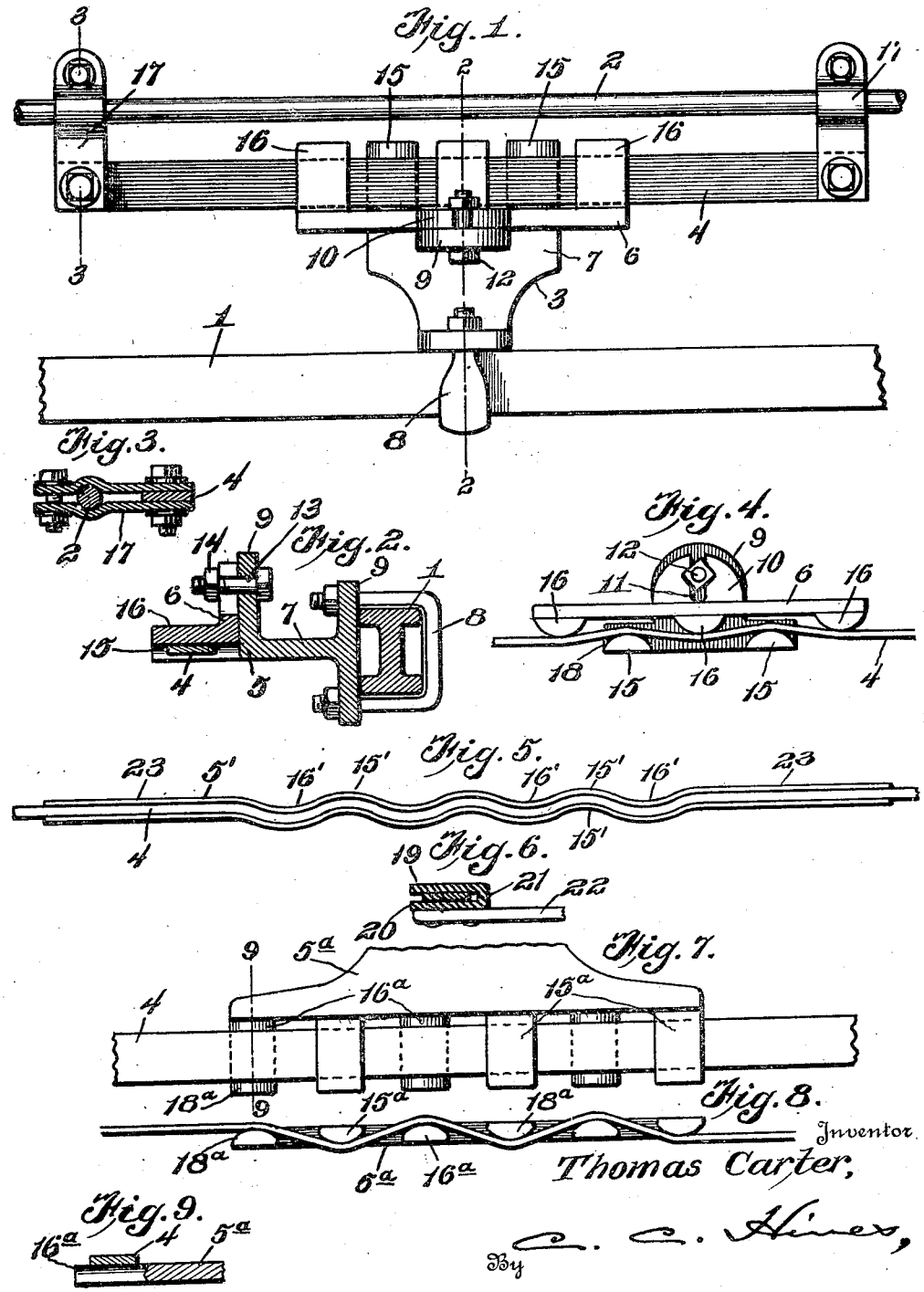

1,514,433

UNITED STATES PATENT OFFICE.

THOMAS CARTER, OF WESTS MILL, NORTH CAROLINA.

FRICTION CHECK FOR AUTOMOBILE STEERING GEAR.

Application filed November 14, 1922. Serial No. 600,876.

*To all whom it may concern:*

Be it known that I, THOMAS CARTER, a citizen of the United States, residing at Wests Mill, in the county of Macon and State of North Carolina, have invented new and useful Improvements in Friction Checks for Automobile Steering Gears, of which the following is a specification.

This invention relates to a friction check for automobile steering gear, and the primary object of the invention is to provide a simple, reliable and efficient type of device for holding the steering mechanism of the vehicle normally centered, so as to maintain the vehicle in a straight course, thereby relieving the driver of mental strain and labor, particularly in driving the vehicle over rough roads, and relieving both the running gear and the driver of the shocks and strains ordinarily transmitted to the steering wheel through the steering mechanism in the travel of the vehicle wheels over obstructions or irregularities in the road surface.

Another object of the invention is to provide a safety friction check which, in the event of the breakage or derangement of the steering wheel or steering post, will maintain the vehicle in a straight course of travel, thereby giving the driver the opportunity of applying the brakes and bringing it to a stop before it passes beyond control. Still another object of the invention is to provide a friction check of novel construction which, while efficient for the purposes described, will allow the vehicle to be steered with ease and convenience, and which is not liable to bind or otherwise get out of order so as to render the steering gear uncontrollable.

Still another object of the invention is to provide a type of friction check having a novel construction of friction means which, while positive and certain in action, will reduce wear and tear thereon to the minimum.

Still another object of the invention is to provide a friction check which may be easily manufactured and installed for use at a comparatively low price, and which may be easily repaired when required or adjusted to maintain it in proper working condition.

With these and other objects in view, the invention consists of the features of construction, combination and arrangement of parts hereinafter fully described and claimed, reference being had to the accompanying drawing, in which:—

Figure 1 is a top plan view of the front axle and steering rod of an automobile, showing my improved friction check as applied thereto.

Figure 2 is a vertical section on the line 2—2 of Figure 1.

Figure 3 is a vertical section on the line 3—3 of Figure 1.

Figure 4 is a view in rear elevation of the parts of the friction head and portion of the friction strap sliding therethrough.

Figure 5 is a rear elevation of a friction check of modified construction.

Figure 6 is a vertical transverse section through the form of device shown in Figure 5.

Figure 7 is a top plan view of another modified form of friction check device.

Figure 8 is a rear elevation of the same.

Figure 9 is a vertical section on the line 9—9 of Figure 7.

Referring now more particularly to the drawing, 1 designates the front axle and 2 the steering rod of the steering gear of an automobile of any standard construction. The rod 2 is pivotally connected at its ends in practice, as usual, to arms upon steering knuckles, pivotally mounted upon the ends of the axle 1, which knuckles carry the dirigible axle spindles on which the front wheels of the vehicle are mounted. As is well known, the rod 2 is shifted in one direction or the other transversely of the vehicle, through movements of the steering wheel and parts of the steering gear operated thereby, for swinging the knuckles laterally and thereby transmitting steering motions to the vehicle wheels.

In accordance with my invention I provide a friction check comprising a stationary friction head, generally indicated at 3, which is fixed to the axle 1, and a cooperating friction strap 4 which is secured to the steering rod 2 and is movable between and in contact with friction surfaces formed upon or carried by said friction head. In the form of the invention shown in Figures 1 to 4, inclusive, the friction head comprises a pair of vertically spaced or superposed friction clamping members 5 and 6. The member 5 is provided with a bracket portion 7 arranged to bear against the inner vertical face of the axle 1, at a point centrally of said axle, and secured thereto by a U-bolt or other suitable fastening means 8. The member 5 is also provided with an upright flange 9 against the rear surface of which bears a similar flange 10 upon the member 6. This flange 10 is bifurcated or provided with a slot 11 opening at its upper end through the upper edge of said flange, and a bolt 12, passing through said slot 11 and through a perforation or opening 13 in the flange 9, and provided with a fastening nut 14, is employed to hold said members 5 and 6 assembled and adjustably connected.

The member 5 is formed or provided with a plurality of rearwardly extending friction lugs or fingers 15, while the member 6, is provided with a plurality of similar friction lugs or fingers 16, and the central or intermediate portion of the strap 4 extends between and is adapted to slide in contact with the friction surfaces of said lugs or fingers 15 and 16.

The strap 4 may be made of any suitable material, but preferably is a flat strap of comparatively thick and tough leather. It extends in advance of the steering rod 2 and parallel therewith, and is secured at its opposite ends by clips 17 to said rod, which clips may be of the construction shown clearly in Figure 3. The length of the strap 4 is preferably somewhat less than the distance between the points of connection of the rod 2 with the arms of the steering knuckles, and the strap is preferably of a width somewhat less than the length of the friction lugs or fingers 15 and 16, so that a degree of back and forth sliding movement of the strap on the fingers may be permitted, as the rod 2 shifts backwardly and forwardly to an extent in its sidewise steering motions, to prevent any liability of the disengagement of the strap from its working position between the fingers.

In the present instance, I have shown the provision of two lugs or fingers 15 upon the member 5 and three lugs or fingers 16 upon the member 6, but this arrangement may be reversed, or a greater number of lugs or fingers may be provided upon the respective members. Said lugs or fingers are however preferably provided with rounded friction surfaces 18 for engagement with the strap, and the lugs or fingers 15 and 16 are disposed so as to lie in different vertical planes or are staggered with relation to each other, the lugs 15 on the member 5 being placed on vertical lines between and in alternation with the planes in which the lugs 16 lie. The friction surfaces 18 of the lugs are also disposed so as to lie in substantially the same horizontal plane, thus forming crimps or bends in the portion of the strap 4 which passes between the opposing sets of friction lugs or fingers. In other words, the lugs are arranged to deflect portions of the strap in opposite directions beyond their normal horizontal plane. By this means a frictional engagement is instituted between the strap and lugs which is positive, certain and reliable, and of sufficient degree to hold the front wheel centered against all normal jolts, stresses and strains, while reducing the friction wear and tear upon the friction head and strap, and at the same time ensuring a delicacy of frictional engagement which will allow the steering rod to be moved for positive steering motions without requiring the exertion of any considerable degree of force upon the steering wheel. Wear and tear upon the friction surface is further reduced by the provision of the rounded friction surfaces 18 and the arrangement of the friction lugs in spaced relation so as to have a reduced frictional bearing connection with the friction strap. It will be observed that the frictional action instituted is due more particularly to the crimping or bending of portions of the strap out of their normal plane, instead of by the use of closely engaging frictional surfaces of comparatively large area, the deflection of the strap giving a sufficient frictional binding action without the necessity of resorting to the use of frictional surfaces of large extent, whereby efficiency of action may be obtained with the smallest degree of wear and tear upon the friction surfaces of the working parts.

It will be understood that the degree of frictional resistance to the movement of the strap 4 may be regulated and varied by adjustment of the member 6 to vary the pressure of the lugs 15 and 16 on the strap 4, and the degree of crimping or deflection of said strap 4 by said lugs, so that any degree of frictional resistance to the movement of the strap may be provided for as occasion may require to suit any particular car. By such reduction of the wear and tear of the working parts, I may employ a strap 4 of leather which will have great durability, or in lieu thereof may employ a band or strap of metal without, in the latter instance, causing the great degree of wearing action ordinarily caused by the movements of one metal part upon another.

It will be observed that the friction surfaces of the friction head 3 extend in a direction transverse of and parallel with the axle 1, while the strap 4 is parallel with the steering rod 2, and that in the motions of the steering rod 2 a substantially straight-line transverse motion of the strap 4 between the friction surfaces 15 and 16 is secured. By this means any tendency to distortion of the parts, such as would be caused by pivotal or other irregular motions of cooperating friction surfaces, will be effectually avoided, enabling the degree of frictional action to be regulated to the exact degree required by the steering gear of the vehicle to which the device is applied. Also this type of sliding friction check, constructed as described, will be entirely free from any tendency to bind, warp or otherwise get out of order, with the liability of so locking the steering rod to the axle that the wheel can not be turned by operation of the steering wheel for vehicle steering actions.

In the form of my invention shown in Figure 5, I provide a friction head 5', preferably in the form of a stamping of sheet metal. This friction head comprises a portion of metal bent to form upper and lower plates 19 and 20 connected at their forward edges by a vertical web 21, said plates forming an intervening guideway open at its rear and opposite ends. To said head 5' is riveted or otherwise secured a bracket member 22, partially shown in Figure 6, which may correspond with the parts 7 of the head 5 and be provided with a flange 9 and secured to the axle 1 by a U-bolt 8, in similar manner to the friction head of the construction shown in Figures 1 to 4. This friction head 5' is provided with an intermediate friction surface formed by alternately bending or crimping the plates 19 and 20 in opposite directions, providing upstanding offsets 15' and downstanding offsets 16' of arcuate form. Through the channel formed between the plates 19 and 20 the strap 4 is fitted to slide, and portions of this strap are deflected upwardly and downwardly, or crimped, by the portions 15' and 16', as shown. By this means a frictional engagement will be instituted between the friction head and strap and retarding crimps simultaneously formed to set up a desired resistance to the sliding movement of the strap. This form of construction is deemed desirable for use in some cases where economy of construction is to be considered. Beyond the crimped portions 15' and 16' the head 5' is provided with extended, straight end portions 23, which may be of any length desired, so that the head may be elongated to enclose and cover the strap for the greater portion of its length. By this means the strap may be protected from oil, water and grit or other particles which would be normally thrown against the same in the travel of the vehicle, reducing undue wear and tear and undesirable friction.

In the form of my invention shown in Figures 7, 8 and 9, I provide a one-piece friction head device which may be of cast construction. This friction head may be secured to the axle in the same manner as the friction head 5, and said head is provided with two sets of rearwardly extending friction fingers or lugs 15$^a$ and 16$^a$. These fingers or lugs lie in substantially the same horizontal plane, but the lugs 15$^a$ have rounded lower friction surfaces 18$^a$ terminating above the bottom faces of the lugs 16$^a$, while said lugs 16$^a$ have rounded upper friction surfaces 18$^a$ terminating above the tops of the lugs 15$^a$, such fingers being, therefore, substantially of the same formation as the fingers 15 and 16 of the friction head 5. With the construction shown in Figures 7, 8 and 9, however, both sets of fingers are rigid with a one-piece head and inadjustable with relation to each other. Also with this arrangement the strap 4 is threaded between the lugs upwardly and downwardly so as to form pronounced kinks or deflected portions bearing against the curved friction surfaces 18. This construction may be employed when it is desired to use a one-piece cast friction head which may be economically manufactured and which does not afford relative adjustment of the opposed friction lugs or fingers for varying their frictional pressure.

From the foregoing description, taken in connection with the drawing, the construction and mode of operation of my improved safety friction check for the steering gear of automobiles will be readily understood, and it will be seen that a device of this character is provided which is simple in construction and which may be manufactured and installed for use at a comparatively low cost. Also the advantages in the use of this device over prior types will be readily understood and appreciated from the foregoing description.

It is to be understood that I do not limit myself to any particular mode of manufacture, use of materials or number of parts comprising each element of the device, as the metal elements of the device may be made by casting, stamping or other methods of manufacture, and of any suitable number of parts as may be found most advisable in practice. Also I may provide for use upon the friction head of any practically employed forms of the device a casing or covering for the strap to partially or wholly enclose and protect the same from oil, water, dirt, etc., and from possibility of injury by contact with extraneous objects.

Having thus fully described my invention, I claim:

1. In an automobile steering gear check, the combination with the front axle, and the steering rod of the steering gear, of a friction member on the axle comprising sections extending transversely of the vehicle and having friction surfaces, and a flat flexible friction member carried by the steering rod, said flat flexible friction member being slidable longitudinally across the friction surfaces of the first-named friction member.

2. In an automobile steering gear check, the combination of an axle, a steering rod, a friction head upon the axle comprising sections extending transversely of the vehicle, a flat flexible non-metallic friction strap carried by the steering rod, and undulating friction surfaces upon the friction head arranged to bear against the opposite sides of the friction strap.

3. In an automobile steering gear check, the combination of a vehicle axle, a steering rod, a friction head carried by the axle and comprising sections extending transversely of the vehicle, a flat flexible non-metallic friction strap carried by the steering rod, a set of friction members upon the head bearing against one side of the strap, and a set of friction members upon the section of the head bearing against the opposite side of the strap, the friction members of said sets being arranged in staggered order so as to form undulations in said strap.

4. In an automobile steering gear check, the combination of a vehicle axle, a steering rod, a friction head upon the axle comprising sections extending transversely of the vehicle, a flat, flexible non-metallic friction strap carried by the rod, and friction surfaces upon the head arranged to bear against opposite sides of the strap and with which said strap is in sliding contact, said surfaces being arranged to produce undulations in the length of said strap.

5. In an automobile steering gear check, the combination of a vehicle axle, a steering rod, a friction head upon the axle composed of adjustably related members having spaced and alternately disposed friction surfaces, and a flat flexible friction strap carried by the steering rod and extending between said friction members of the head and in sliding contact with the friction surfaces thereof.

6. In an automobile steering gear check, the combination of a vehicle axle, a steering rod, a two-part friction head carried by the axle and extending parallel therewith, said head having two sets of horizontally spaced friction fingers, the friction fingers of one set being arranged alternately with and on lines between the friction fingers of the other set, and a flat flexible non-metallic friction strap carried by the steering rod and slidably mounted between and having its opposed flat surfaces lying in sliding engagement with the respective sets of fingers.

7. In an automobile steering gear check, the combination of a vehicle axle, a steering rod, a stationary friction element on the axle having spaced friction surfaces, and a flat non-metallic flexible friction strap carried by the rod and extending between said friction surfaces and in sliding engagement therewith.

8. In an automobile steering gear check, the combination of an axle, a steering rod, a stationary friction device on the axle, said device having friction surfaces, and a friction strap carried by the rod, said strap being arranged between and having its opposite sides in sliding engagement with said friction surfaces, said friction surfaces being arranged to form reverse bends in the portions of the strap engaged thereby.

9. In an automobile steering gear check, the combination of an axle, a steering rod, a friction head comprising a bracket fixed to the axle and carrying a pair of friction jaws, said jaws having opposed friction surfaces arranged in alternation with each other, means adjustably and detachably connecting said friction jaws, and a flat band or strap of flexible material passing between said friction surfaces and terminally secured to the steering rod on opposite sides of said friction head.

10. In an automobile steering gear check, the combination of an axle, a steering rod, a friction head extending in a direction parallel with the axle and steering rod, said head being provided along its length with a series of upper and lower friction surfaces arranged in alternation with each other and disposed in series parallel with the axle and steering rod, and a flat friction band movable longitudinally between said series of friction surfaces and secured at its ends to the steering rod on opposite sides of the friction head.

In testimony whereof I affix my signature.

THOMAS CARTER.